United States Patent [19]
Kausz et al.

[11] 3,964,965
[45] June 22, 1976

[54] PRESSURIZED-WATER REACTOR COOLANT GAS DISPOSAL SYSTEM

[75] Inventors: Ivan Kausz, Weiher; Helmut Stünkel; Harald Wille, both of Erlangen, all of Germany

[73] Assignee: Siemens Aktiengesellschaft, Munich, Germany

[22] Filed: Jan. 17, 1974

[21] Appl. No.: 434,356

[30] Foreign Application Priority Data
Jan. 22, 1973  Germany............................ 2302905

[52] U.S. Cl................................. 176/37; 176/38; 176/92 B
[51] Int. Cl.²......................................... G21C 19/32
[58] Field of Search...................... 176/37, 38, 92 B

[56] References Cited
UNITED STATES PATENTS

| | | | |
|---|---|---|---|
| 3,203,866 | 8/1965 | Lehmer et al. | 176/37 |
| 3,404,067 | 10/1968 | Rendos | 176/37 |
| 3,660,041 | 5/1972 | Moore et al. | 176/37 |
| 3,748,864 | 7/1973 | Lofredo et al. | 176/37 X |
| 3,850,593 | 11/1974 | Beaujean et al. | 176/37 X |

Primary Examiner—Samuel W. Engle
Assistant Examiner—Peter A. Nelson
Attorney, Agent, or Firm—Kenyon & Kenyon Reilly Carr & Chapin

[57] ABSTRACT

A pressurized-water reactor has a coolant degassing facility separating gases from the coolant. These gases include noble gases and cannot be disposed of directly to the atmosphere. The noble gases are separated from the other gases and stored, and being of small volume relative to the other gases, their storage facility can be of small size while accommodating a prolonged reactor operating time. The reactor installation includes a coolant gas charging facility and some of the gases from which the noble gases are separated may be used to supply this facility. Excess gases involve no unusual problems concerning their discharge to the atmosphere.

4 Claims, 1 Drawing Figure

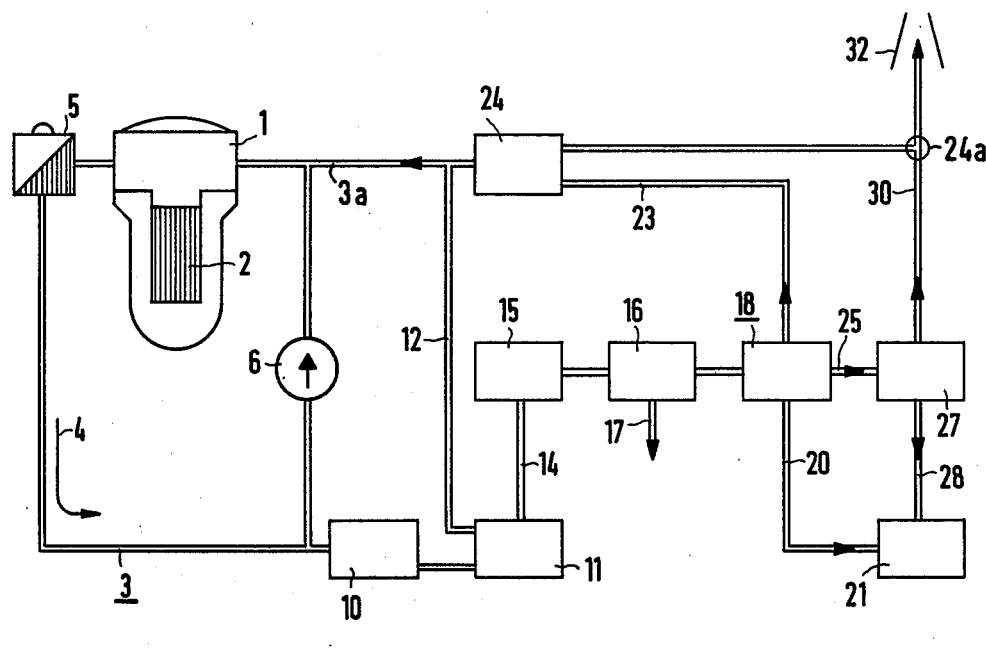

PRESSURIZED-WATER REACTOR COOLANT GAS DISPOSAL SYSTEM

BACKGROUND OF THE INVENTION

A pressurized-water reactor installation includes the reactor pressure vessel containing the core which heats the pressurized-water coolant circulated through the pressure vessel via a pipeline loop extending through a steam generator producing steam as useful power, and from there via a main coolant pump, back to the pressure vessel. A branch pipeline loop shunts a portion of the circulating water coolant around the main coolant pump and through a water coolant purification system, about from 10 to 20% of the circulating water coolant passing continuously through this purification system during operation of the reactor. A part of this purification system is a degassing facility wherein the water coolant is decompressed and cooled so that gases separate. These gases are mainly hydrogen, nitrogen and oxygen.

However, in addition to the above three gases the separated gases include the noble gases krypton and xenon which are present in volumes that are very small as compared to the volume of the other gases but which mandatorily prevent disposal of the separated gases by discharging them to the atmosphere.

The one prior art suggestion has been to store the separated gases under pressure in decay tanks for a time depending on the half-life of the radioactive noble gases and to thereafter discharge the gases to the atmosphere via a tall exhaust air stack through which is also discharged the exhaust air from the spherical steel containment vessel enclosing the entire reactor installation. However, this practice has been prevented by current, more stringent environmental protection regulations.

Therefore, the operation of a pressurized-water reactor installation has presented the problem of disposing of the gases separated from the water coolant during its purification, in a manner that is economically feasible and entirely safe from the environmental pollution viewpoint.

SUMMARY OF THE INVENTION

The object of the present invention is to provide a solution to the above problem and this has been achieved in the following manner:

Basically, the concept of the invention is that separation and isolation of the noble gases permits the other gases to be disposed of free from problems connected with radioactivity. The noble gases are included by the other gases in such small amounts that their isolation might be effected by storage in a tank or tanks which may be of small volumetric capacity while still capable of accepting all of the noble gases resulting from full reactor operation periods which may extend for as much as one year. In the case of a pressurized-water reactor installation operating as a power reactor of 1000 MWe for an operational period of one year, the noble gases can be stored in a steel bottle containing activated carbon and having a volumetric capacity of less than 1m$^3$, a volumetric capacity of 0.1m$^3$ or smaller being preferred. This is a very miniaturized tank as compared to the decay tanks required for storage of the gases by the prior art proposal previously referred to.

In addition to the above advantage, the invention further involves combining the separated oxygen with a portion of the hydrogen and sending the balance of the hydrogen to the water coolant gas-charging system to provide the coolant with the hydrogen excess desired in the case of light-water reactors in general, and in particular, a pressurized-water reactor. Nitrogen is also added to the coolant by this gas-charging system and the separated nitrogen may be sent to this system for use there, or safely discharged to the atmosphere.

BRIEF DESCRIPTION OF THE DRAWING

The principles of the invention are illustrated by the accompanying drawing which is a flow diagram.

DETAILED DESCRIPTION OF THE INVENTION

Having reference to the above drawing, the reactor pressure vessel 1 contains the core 2, the coolant main pipeline loop is shown at 3 and the direction of the coolant flow is indicated by the arrow 4. The coolant flows from the pressure vessel 1 to the steam generator 5 and is returned to the pressure vessel under the force of the pump 6 which maintains the circulation in the loop 3. The secondary coolant pipeline loop 3a is shunted around the pump 6 so as to pass from 10 to 20% of the coolant through the coolant water purification system 10 which included the degassing facility 11 where the coolant is decompressed and cooled so that its gases are separated. The degassed water coolant returns to the pressure vessel 1 via the pipeline 12 which is part of the secondary loop 3a. The separated gases flow through the pipe 14. As previously mentioned, these gases are mainly hydrogen, nitrogen and oxygen but they also include small amounts of the noble gases krypton and xenon making the disposal of the gases a problem as previously indicated.

According to the invention, these gases are passed by the pipe 14 into a recombiner 15 which is of the catalytic type, the amount of oxygen relative to the hydrogen being insufficient to support flame combustion. In this way the oxygen is removed from the gases, the output from the recombiner 15 going through a dryer or water separator 16 from which the water flows via a pipe 17 for return to the water system of the reactor installation or disposed of.

The gases leaving the recombiner 16 then go into a gas separation facility generally indicated by 18. This gas separation facility may be of the type which through condensation and step-wise evaporation of the different gases effected via suitable heat exchangers, effects the separation according to the liquification temperatures of the gaseous components. Known equipment is capable of separating the major part of the noble gases in the gas mixture leaving the recombiner 16, particularly krypton and xenon, and these are fed via a pipe 20 to the previously referred to gas storage facility 21. The latter can be a steel bottle containing for better absorption, activated carbon. Its volumetric capacity need not be greater than 1m$^3$ and preferably it is of much smaller size, such as less than 0.1m$^3$. Such capacities are sufficient for storing the noble gases produced in the course of a years operation of a pressurized-water powered reactor of 1000 MWe. The separated hydrogen is sent through a pipe 23 and to the water coolant gas-charging system 24 which normally also includes a storage facility for the hydrogen, permitting its use as required. This facility 24 feeds into the secondary loop 3a as required to maintain the water coolant's hydrogen concentration, or possibly used elsewhere.

It is important to note that the purity requirements for the hydrogen with respect to radioactivity components are so low that the gas separation facility 18 need not operate with great efficiency and, therefore, can be constructed and operated inexpensively as compared to the expense that would be required for the complete removal of the noble gases.

The condensed nitrogen and possibly some remaining portion of the noble gases are fed from the facility 18 via a pipe 25 to a unit 27 of the type which by partial evaporation or rectification entirely separates the nitrogen from any remaining noble gases, the latter going through a pipe 28 to the previously described noble gas storage bottle 12. The separation here should be adequate to remove all remaining noble gases to a degree permitting discharge of nitrogen to the atmosphere if desired. As shown, the nitrogen leaves 27 via a pipe 30, a valve 24a serving to send the nitrogen either to the gas-charging facility 24 or to a gas stack 32 discharging the nitrogen to the atmosphere, this being entirely safe from the environmental pollution viewpoint as it now or may potentially in the future exist.

Neither of the facilities 11 and 18 are required to separate completely all of the noble gases. This is required in the case of the facility 27 but here the content of noble gases is already very small as compared to the initial content and they must be separated only from the nitrogen. It follows that the previously described problem is solved by this invention in an economical way while meeting the environmental requirements which the previously described prior art system could not do satisfactorily.

What is claimed is:

1. A pressurized-water reactor installation comprising a pressure vessel and a core inside of said vessel, means for forming a main coolant pipe line loop for said vessel and containing a pressurized-water coolant having a continuous circulation through said loop, pressure vessel and core, said coolant containing a mixture of gases including as components hydrogen and relatively smaller amounts of radioactive krypton and xenon, a water coolant purification system including means for decompressing and cooling said coolant to separate at least a portion of said mixture from the coolant as a separated mixture, means for shunting a circulating portion of said circulation continuously through said system and producing the separated mixture, the separated mixture's krypton and xenon components preventing discharge of the separated mixture to the atmosphere, gas separation means for receiving the separated mixture and for separating at least some of said krypton and xenon from the hydrogen of said components by subjecting the mixture to condensation and step-wise evaporation of the components, means for returning to said circulation at least a portion of the hydrogen component separated by said gas separating means, and means for storing the krypton and xenon components separated by said gas separating means.

2. The installation of claim 1 in which said components include oxygen, and having interposed between said degassing means and said gas separation means, recombining means for recombining said oxygen component and a portion of said hydrogen component of said separated mixture to form water and for removing this last-named water from the mixture, whereby the mixture is substantially freed from oxygen when received by said gas separation means.

3. The installation of claim 2 in which there is interposed between said recombining means and said gas separation means, means for drying said mixture.

4. The installation of claim 1 in which said components include nitrogen, and having means for receiving the nitrogen component separated by said gas separation means and for completely separating from the nitrogen any remainder of krypton and xenon mixed with nitrogen and for storing said remainder, permitting safe disposal of the nitrogen.

* * * * *